(12) United States Patent
Sugimoto

(10) Patent No.: US 12,305,586 B2
(45) Date of Patent: May 20, 2025

(54) ENGINE CONTROL DEVICE

(71) Applicant: TOYOTA JIDOSHA KABUSHIKI KAISHA, Toyota (JP)

(72) Inventor: Hitoki Sugimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/675,456

(22) Filed: May 28, 2024

(65) Prior Publication Data

US 2025/0020086 A1    Jan. 16, 2025

(30) Foreign Application Priority Data

Jul. 14, 2023 (JP) ................................. 2023-116034

(51) Int. Cl.
| | |
|---|---|
| *F02D 41/06* | (2006.01) |
| *F02D 19/06* | (2006.01) |
| *F02D 19/08* | (2006.01) |
| *F02D 41/00* | (2006.01) |

(52) U.S. Cl.
CPC ....... *F02D 41/068* (2013.01); *F02D 19/0649* (2013.01); *F02D 19/08* (2013.01); *F02D 41/0025* (2013.01); *F02D 2200/0611* (2013.01); *F02D 2200/1002* (2013.01); *F02D 2200/101* (2013.01)

(58) Field of Classification Search
CPC .... F02D 41/068; F02D 19/0649; F02D 19/08; F02D 41/0025; F02D 2200/0611
See application file for complete search history.

(56) References Cited

U.S. PATENT DOCUMENTS

| | | | |
|---|---|---|---|
| 2005/0126551 A1* | 6/2005 | Mello | F02D 19/088 123/549 |
| 2010/0191439 A1* | 7/2010 | Fabien | F02D 19/0623 123/344 |
| 2012/0028758 A1* | 2/2012 | Stein | F02D 37/02 123/305 |

FOREIGN PATENT DOCUMENTS

JP    2007-162649 A    6/2007

* cited by examiner

*Primary Examiner* — Kevin A Lathers
(74) *Attorney, Agent, or Firm* — SoraIP, Inc.

(57) ABSTRACT

A control device changes an operation line of an engine to an operation line according to an alcohol concentration on the condition that warm-up of the engine has been completed. Thus, when warm-up of the engine has been completed, the control device changes an operating point that is set according to a required output toward a higher torque side and a lower speed side when the alcohol concentration in a blended fuel is high than when the alcohol concentration in the blended fuel is low. When warm-up of the engine has not been completed, the control device does not execute the change according to the alcohol concentration in the blended fuel of the operating point set according to the required output.

4 Claims, 5 Drawing Sheets

ENGINE CONTROL DEVICE

CROSS-REFERENCE TO RELATED APPLICATION

This application claims priority to Japanese Patent Application No. 2023-116034 filed on Jul. 14, 2023, incorporated herein by reference in its entirety.

BACKGROUND

1. Technical Field

The present disclosure relates to an engine control device.

2. Description of Related Art

Engines capable of using alcohol-blended fuels in which an alcohol fuel and a gasoline fuel are blended at arbitrary ratios are known. Japanese Unexamined Patent Application Publication No. 2007-162649 (JP 2007-162649 A) discloses a control device that controls an engine capable of using an alcohol-blended fuel. An alcohol fuel has a high octane number compared with a gasoline fuel. When the octane number is high, knocking is less likely to occur, so that a higher torque can be generated by advancing an ignition timing. Therefore, the control device disclosed in JP 2007-162649 A changes an operating point of the engine according to the octane number of the fuel such that thermal efficiency becomes maximum or that a state where the thermal efficiency becomes maximum is approached. The operating point of the engine is defined by an engine torque and an engine speed for achieving a required output. The control device controls the engine so as to achieve the engine torque and the engine speed defining the operating point that is set according to the required output. Specifically, the control device disclosed in JP 2007-162649 A changes the operating point of the engine set according to the required output toward a high torque side and a low speed side as the octane number of the fuel becomes higher.

SUMMARY

When the temperature of the fuel is a low temperature, an alcohol fuel vaporizes less easily than a gasoline fuel. Therefore, when the temperature of the fuel is a low temperature, the higher the alcohol concentration in the fuel is, the more likely it is that poor combustion occurs. When poor combustion occurs, the engine cannot be efficiently operated.

A solution to the above-described problem and workings and advantages thereof will be described below.

An engine control device to solve the above-described problem is an engine control device that is applied to a vehicle equipped with an engine capable of using a blended fuel in which an alcohol fuel and a gasoline fuel are blended at an arbitrary ratio. This control device controls the engine so as to achieve an engine torque and an engine speed that define an operating point set according to a required output. The control device executes, on the condition that warm-up of the engine has been completed, changing the operating point set according to the required output toward a higher torque side and a lower speed side when an alcohol concentration in the blended fuel is high than when the alcohol concentration in the blended fuel is low. Thus, when the warm-up of the engine has not been completed, the control device does not execute the change according to the alcohol concentration in the blended fuel of the operating point set according to the required output.

This engine control device allows efficient operation of the engine by restricting a needless increase in a fuel injection amount.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

One embodiment of an engine control device will be described below with reference to FIG. 1 to FIG. 5.

First, the configuration of a drive system of a hybrid electric vehicle that an engine control device 10 of this embodiment controls as a target will be described with reference to FIG. 1. This control device 10 doubles as a control device of a hybrid system.

Figure 1:
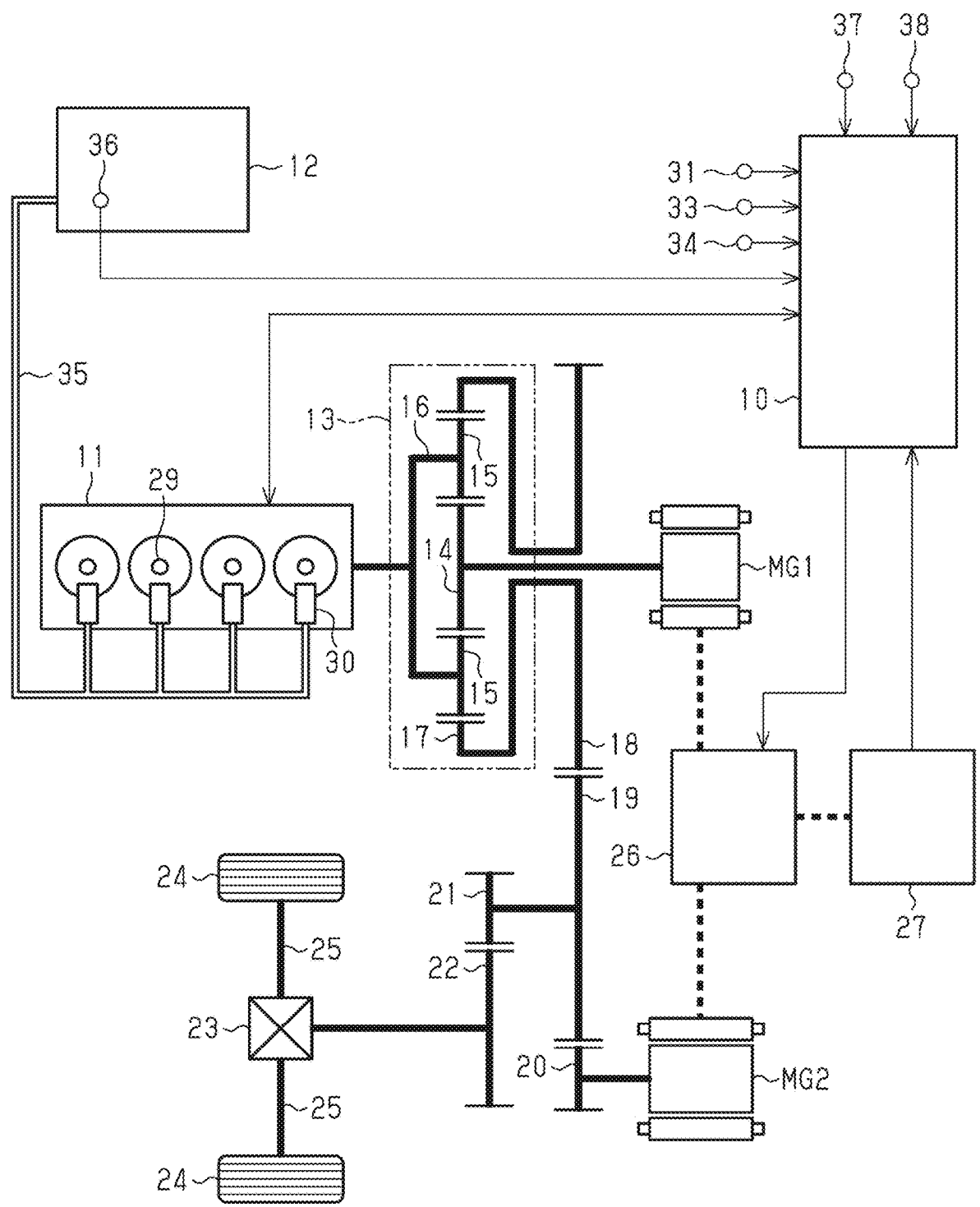
FIG. 1 is a schematic diagram showing the configuration of a drive system of a hybrid electric vehicle to which one embodiment of an engine control device is applied.

As shown in FIG. 1, the hybrid electric vehicle to which the control device 10 is applied includes an engine 11, a fuel tank 12, a first motor-generator MG1, a second motor-generator MG2, a power distribution mechanism 13, an inverter 26, and a battery 27. The engine 11 is an engine capable of using a blended fuel in which an alcohol fuel and a gasoline fuel are blended at an arbitrary ratio.

The power distribution mechanism 13 is composed of a sun gear 14, a pinion gear 15, a planetary carrier 16, and a ring gear 17. The sun gear 14 rotates on its axis at a center of the ring gear 17. The pinion gear 15 is interposed between the sun gear 14 and the ring gear 17 and revolves around the sun gear 14. The planetary carrier 16 rotates as the pinion gear 15 revolves. An output shaft of the engine 11 is connected to the planetary carrier 16. The first motor-generator MG1 is connected to the sun gear 14. A counter drive gear 18 is integrally provided on the ring gear 17. A counter driven gear 19 is meshed with the counter drive gear 18. The second motor-generator MG2 is coupled to a reduction gear 20 that is meshed with the counter driven gear 19. A final drive gear 21 is coupled to the counter driven gear 19 so as to be integrally rotatable, and a final driven gear 22 is meshed with the final drive gear 21. Driveshafts 25 of drive wheels 24 are coupled to the final driven gear 22 through a differential mechanism 23.

The first motor-generator MG1 and the second motor-generator MG2 exchange electricity with the battery 27 through the inverter 26. The inverter 26 is a power conversion circuit that converts a terminal voltage of the battery 27 that is a direct-current voltage source into an alternating current and outputs this alternating current.

The engine 11 is provided with ignition devices 29 and injectors 30. One ignition device 29 and one injector 30 are provided for each cylinder of the engine 11. The engine 11 is also provided with a throttle valve.

The engine 11 is supplied with a fuel inside the fuel tank 12 through a fuel supply path 35. The fuel tank 12 is provided with an alcohol concentration sensor 36 that detects an alcohol concentration in a blended fuel.

The control device 10 controls the engine 11, the first motor-generator MG1, and the second motor-generator MG2. Thus, the control device 10 controls a power train of the vehicle.

The control device 10 is connected to an air flow meter 31, a crank angle sensor 33, a coolant temperature sensor 34, the alcohol concentration sensor 36, an accelerator operation amount sensor 37, and a vehicle speed sensor 38.

The air flow meter 31 is a sensor that detects an intake air amount in an air intake passage of the engine 11. The crank angle sensor 33 is a sensor that detects a crank angle that is a rotation angle of a crankshaft of the engine 11. The coolant temperature sensor 34 is a sensor that detects an engine coolant temperature that is a temperature of a coolant of the engine 11. The accelerator operation amount sensor 37 is a sensor that detects an accelerator operation amount. The vehicle speed sensor 38 is a sensor that detects a speed of the vehicle.

The control device 10 acquires an engine speed Ne that is a rotation speed of the crankshaft of the engine 11 by the crank angle sensor 33. The control device 10 obtains a required output of the engine 11 based on the accelerator operation amount acquired by the accelerator operation amount sensor 37 and the vehicle speed acquired by the vehicle speed sensor 38. The control device 10 manipulates the throttle valve, the ignition devices 29, and the injectors 30 to control a torque that is a control amount of the engine 11. To control the engine 11, the control device 10 refers to the intake air amount detected by the air flow meter 31, the engine coolant temperature detected by the coolant temperature sensor 34, and the alcohol concentration in the blended fuel detected by the alcohol concentration sensor 36. The control device 10 manipulates the inverter 26 to control the first motor-generator MG1 and the second motor-generator MG2.

Figure 2:
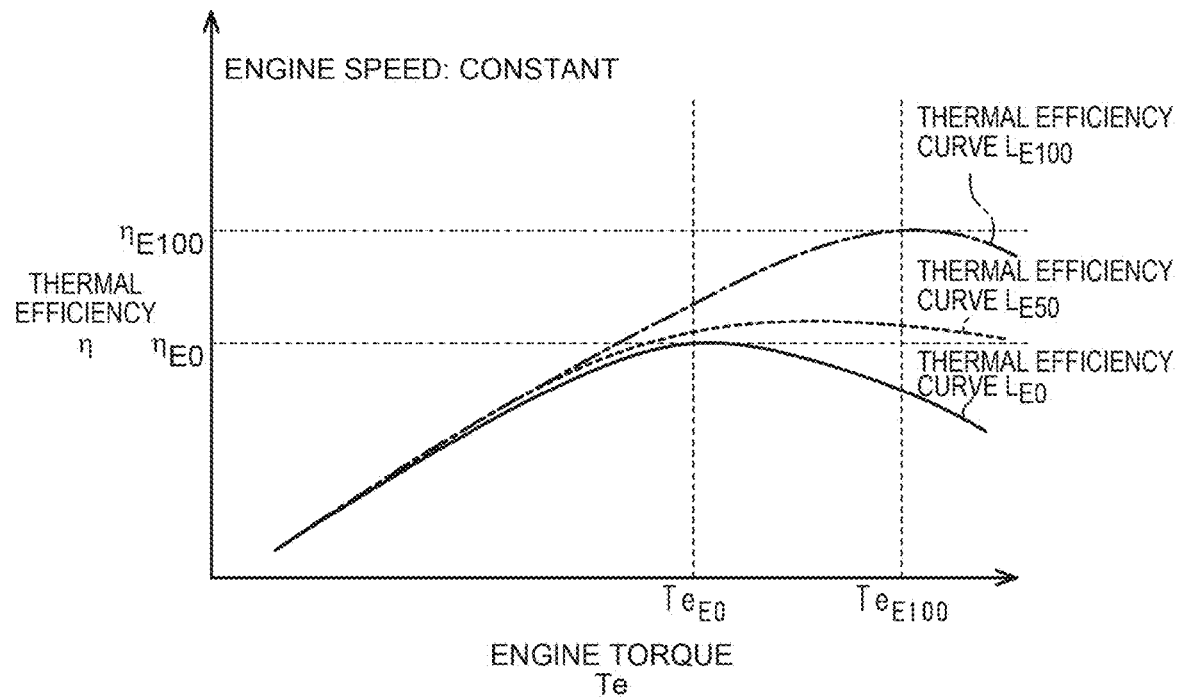
FIG. 2 is a graph showing a relationship between an engine torque and thermal efficiency in the control device of the embodiment.
Figure 3:
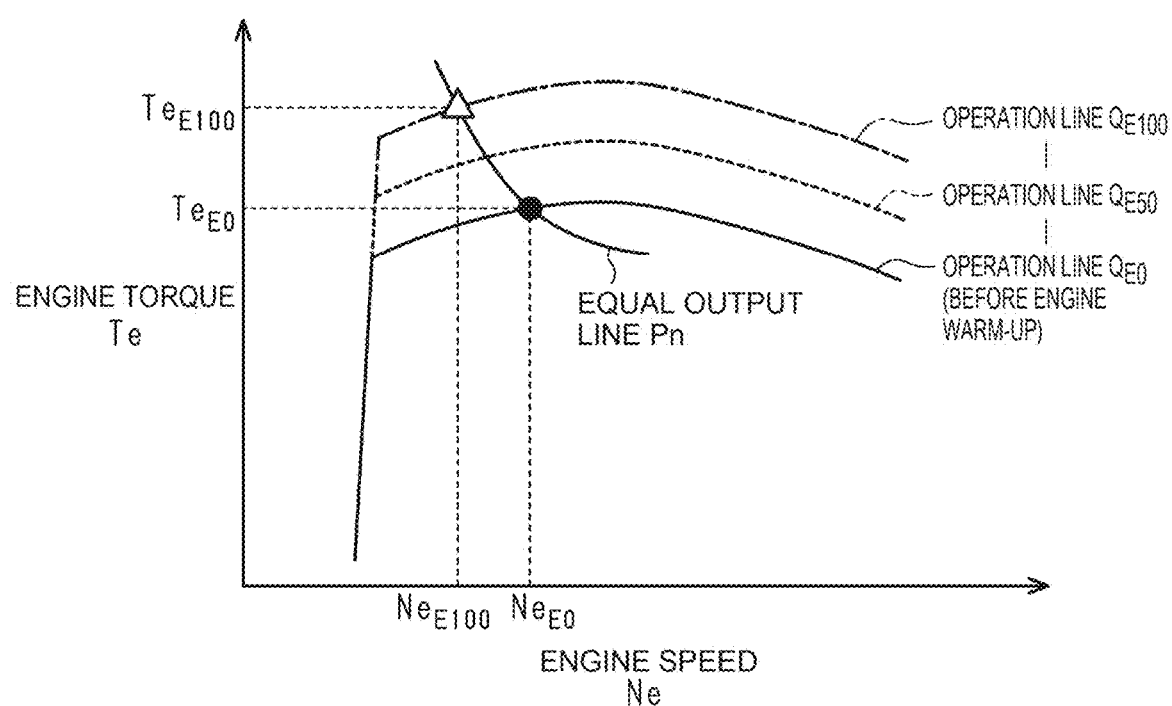
FIG. 3 is a graph showing an aspect of setting operation lines in the control device of the embodiment.

Here, changes in a relationship between an engine torque Te and thermal efficiency η depending on the alcohol concentration in the blended fuel when the engine speed Ne is constant will be described with reference to FIG. 2. The subscripts "E0," "E50," and "E100" in FIG. 2 and FIG. 3 represent alcohol concentrations in the blended fuel. Hereinafter, the subscript letters will be indicated after "_."

As shown in FIG. 2, thermal efficiency curves L_E0, L_E50, and L_E100 are thermal efficiency curves L of the engine 11 when the alcohol concentration in the blended fuel is 0%, 50%, and 100%, respectively. For example, in the thermal efficiency curve L_E0, the thermal efficiency η when the engine 11 is operated at an engine torque Te_E0 is η_E0.

When the engine speed Ne is constant, as the torque becomes higher, a ratio of thermal energy resulting from combustion of the fuel being converted into work increases, and thus the thermal efficiency η rises. However, in the case where the engine 11 is operated in accordance with the thermal efficiency curve L_E0, i.e., in the case where the engine 11 is operated using only a gasoline fuel, when the engine torque Te is increased above the engine torque Te_E0, knocking occurs and the thermal efficiency η decreases. On the other hand, in the case where the engine 11 is operated in accordance with the thermal efficiency curve L_E100, i.e., in the case where the alcohol concentration in the blended fuel is 100%, due to a high octane number of the fuel, knocking is less likely to occur compared with the case where only a gasoline fuel is used as the fuel. Therefore, the engine 11 can be operated at a higher torque. As shown in FIG. 2, in the thermal efficiency curve L_E100, maximum thermal efficiency η_E100 is exhibited at an engine torque Te_E100 that is a higher torque than the engine torque Te_E0. The thermal efficiency η_E100 that is a maximum value of the thermal efficiency η on the thermal efficiency curve L_E100 is a higher value than the thermal efficiency η_E0 that is a maximum value of the thermal efficiency η on the thermal efficiency curve L_E0. Thus, the higher the alcohol concentration in the blended fuel is, the higher the torque is at which the engine 11 can be operated without causing knocking, and therefore the higher the thermal efficiency η is with which the engine 11 can be operated.

Here, control of the engine 11 based on operation lines Q connecting a plurality of operating points that is set according to the required output for the engine 11 in a plane of coordinates having each of the engine torque Te and the engine speed Ne as an axis will be described with reference to FIG. 3. The operating point is defined by the engine torque Te and the engine speed Ne. For example, the operating point indicated by the filled circle in FIG. 3 is an operating point defined by the engine torque Te_E0 and an engine speed Ne_E0. The operating point indicated by the open triangle in FIG. 3 is an operating point defined by the engine torque Te_E100 and an engine speed Ne_E100.

As shown in FIG. 3, the operation lines Q_E0, Q_E50, and Q_E100 are operation lines Q connecting operating points at which the engine 11 exhibits maximum thermal efficiency η in the cases where the alcohol concentration in the blended fuel is 0%, 50%, and 100%, respectively. An equal output line Pn is a line connecting operating points at which the engine output is equal. For each magnitude of the required output, there is a corresponding equal output line Pn. In FIG. 3, the higher the corresponding required output is, the farther on the high torque side and the high speed side the equal output line Pn is located.

Using the selected operation line Q and the equal output line Pn corresponding to the required output, the control device 10 determines the operating point at which the engine 11 is to be operated. Then, the control device 10 controls the engine 11 so as to achieve the engine torque Te and the engine speed Ne that define the operating point.

For example, in the case where the required output corresponding to the equal output line Pn shown in FIG. 3 is to be achieved, when the control device 10 has selected the operation line Q_E0, the control device 10 makes the engine 11 operate at the engine torque Te_E0 and the engine speed Ne_E0. Thus, the control device 10 makes the engine 11 operate at the operating point indicated by the filled circle that is a point of intersection between the equal output line Pn and the operation line Q_E0.

On the other hand, when the control device 10 has selected the operation line Q_E100, the control device 10 achieves an output corresponding to the equal output line Pn by making the engine 11 operate at the engine torque Te_E100 and the engine speed Ne_E100. Thus, the control device 10 makes the engine 11 operate at the operating point indicated by the open triangle that is a point of intersection between the equal output line Pn and the operation line Q_E100.

Since the thermal efficiency η rises as the engine torque Te increases as shown in FIG. 2, when the required output for the engine 11 is the same, the higher the alcohol concentration in the blended fuel is, the higher the thermal efficiency η is with which the engine 11 can be operated. Therefore, by changing, according to the alcohol concentration in the blended fuel, the operation line Q of the engine 11 to be used to calculate the operating point according to the required output, the control device 10 allows efficient operation of the engine 11.

A plurality of operation lines Q is set so as to correspond to alcohol concentrations in the blended fuel, without being limited to the cases where the alcohol concentration in the blended fuel is 0%, 50%, and 100%. In this case, the plurality of operation lines Q is each located in the plane of coordinates shown in FIG. 3 such that the higher the corresponding alcohol concentration in the blended fuel is, the farther on the high torque side the operation line Q is.

As described above, when the control device 10 has selected the operation line Q_E100, the control device 10 makes the engine 11 operate at a higher torque and a lower speed compared with when the control device 10 has selected the operation line Q_E0. When making the engine 11 operate at a high torque and a low speed, the control device 10 needs to increase a fuel injection amount per injection of the injectors 30.

Incidentally, when the temperature of the fuel is low, an alcohol fuel vaporizes less easily than a gasoline fuel. When warm-up of the engine 11 has not been completed, the temperature of the fuel injected from the injectors 30 is low. Thus, increasing the fuel injection amount in a state where warm-up of the engine 11 has not been completed, i.e., a state where the fuel vaporizes less easily would lead to poor combustion and thereby needlessly consume the fuel.

Therefore, the control device 10 performs a change of the operation line Q according to the alcohol concentration in the blended fuel on the condition that warm-up of the engine 11 has been completed.

Figure 4:
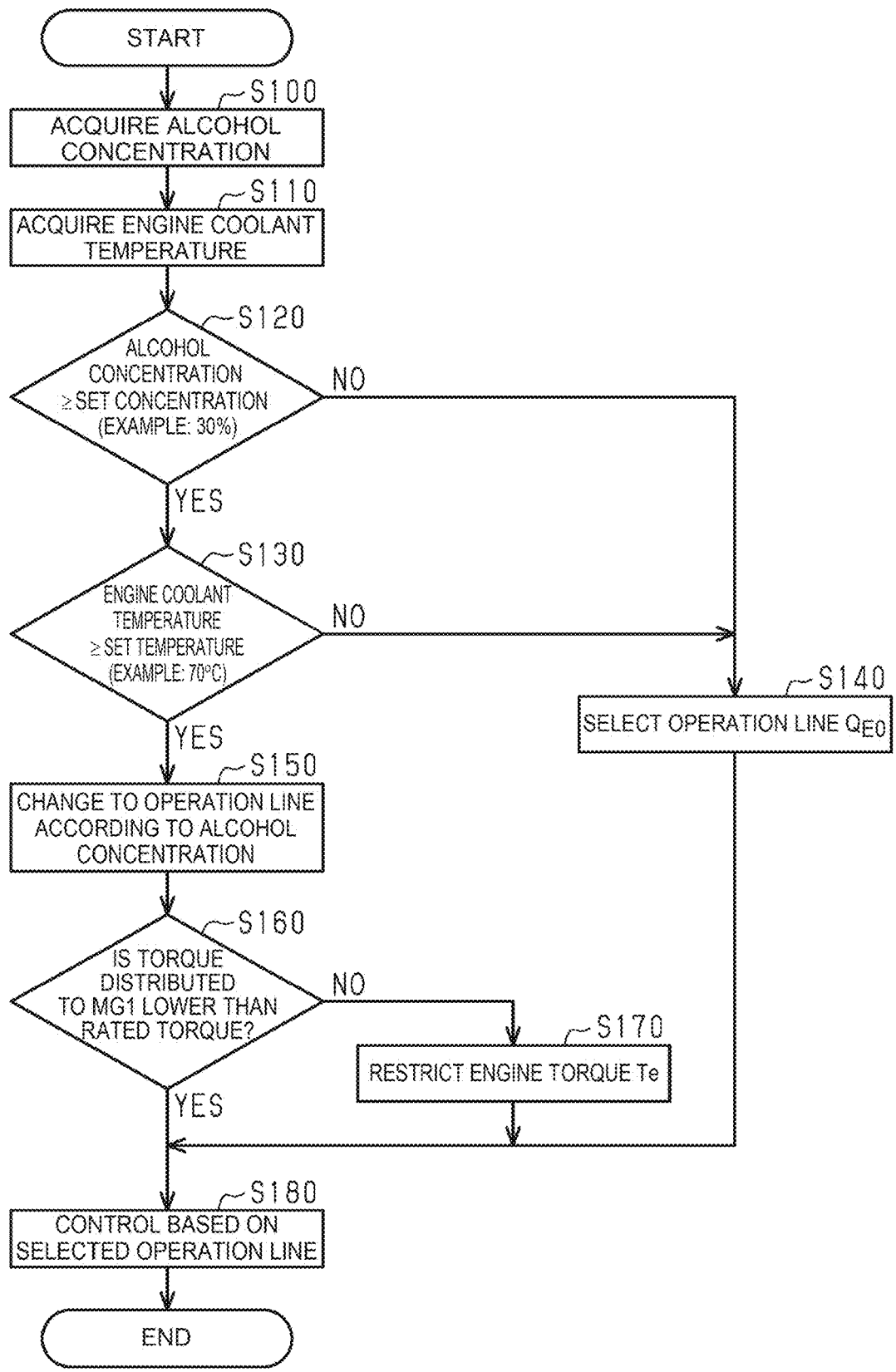
FIG. 4 is a flowchart of engine control in the control device of the embodiment.

FIG. 4 shows a flow of a series of processes that the control device 10 executes. The control device 10 repeatedly executes this series of processes while the engine 11 is in operation.

As shown in FIG. 4, when the control device 10 has started this series of processes, the control device 10 first acquires the alcohol concentration in the blended fuel in the process of step S100. Specifically, the control device 10 acquires the alcohol concentration in the blended fuel by a detection signal of the alcohol concentration sensor 36 installed in the fuel tank 12. Next, in the process of step S110, the control device 10 acquires the engine coolant temperature by a detection signal of the coolant temperature sensor 34.

Next, in the process of step S120, the control device 10 determines whether the alcohol concentration in the blended fuel is equal to or higher than a set concentration. The set concentration is, for example, 30%. The level of the set concentration is set such that it is possible to determine that an alcohol fuel is contained in the blended fuel based on the alcohol concentration being equal to or higher than the set concentration. When the alcohol concentration in the blended fuel is equal to or higher than the set concentration (S120: YES), the process moves to step S130.

In the process of step S130, the control device 10 determines whether the engine coolant temperature is equal to or higher than a set temperature. This process is a process of determining whether warm-up of the engine 11 has been completed. The set temperature is, for example, 70° C. When the engine coolant temperature is 70° C. or higher, the blended fuel vaporizes easily enough. When the control device 10 determines in the process of step S130 that the engine coolant temperature is equal to or higher than the set temperature (step S130: YES), the control device 10 determines that warm-up of the engine 11 has been completed. Then, the process moves to step S150.

In the process of step S150, the control device 10 changes the operation line Q of the engine 11 according to the alcohol concentration in the blended fuel as shown in FIG. 3. Specifically, the higher the alcohol concentration in the blended fuel is, the farther on the high torque side the operation line Q is that the control device 10 selects.

Next, in the process of step S160, the control device 10 determines whether a torque that is distributed from the engine 11 to the first motor-generator MG1 is lower than a rated torque of the first motor-generator MG1.

As shown in FIG. 1, in the case of a hybrid electric vehicle, to transmit the engine torque Te to the drive wheels 24, the control device 10 needs to control the first motor-generator MG1 through the inverter 26 so as to generate a torque for restraining the sun gear 14 from rotating. The control device 10 thereby avoids a situation where the torque generated in the engine 11 is consumed as the sun gear 14 rotates idly. When the magnitude of the torque required to restrain the sun gear 14 from rotating exceeds the rated torque of the first motor-generator MG1, the sun gear 14 cannot be completely restrained from rotating, so that the torque generated in the engine 11 fails to be sufficiently transmitted to the drive wheels 24. Further, when the torque applied to the first motor-generator MG1 exceeds the rated torque of the first motor-generator MG1, the first motor-generator MG1 is subjected to an excessive load.

As shown in FIG. 3, the engine 11 can be operated with high thermal efficiency η by setting the operation line Q farther on the high toque side as the alcohol concentration in the blended fuel becomes higher. On the other hand, when the engine torque Te increases, the torque of the first motor-generator MG1 required to restrain the sun gear 14 from rotating also increases.

Figure 5:
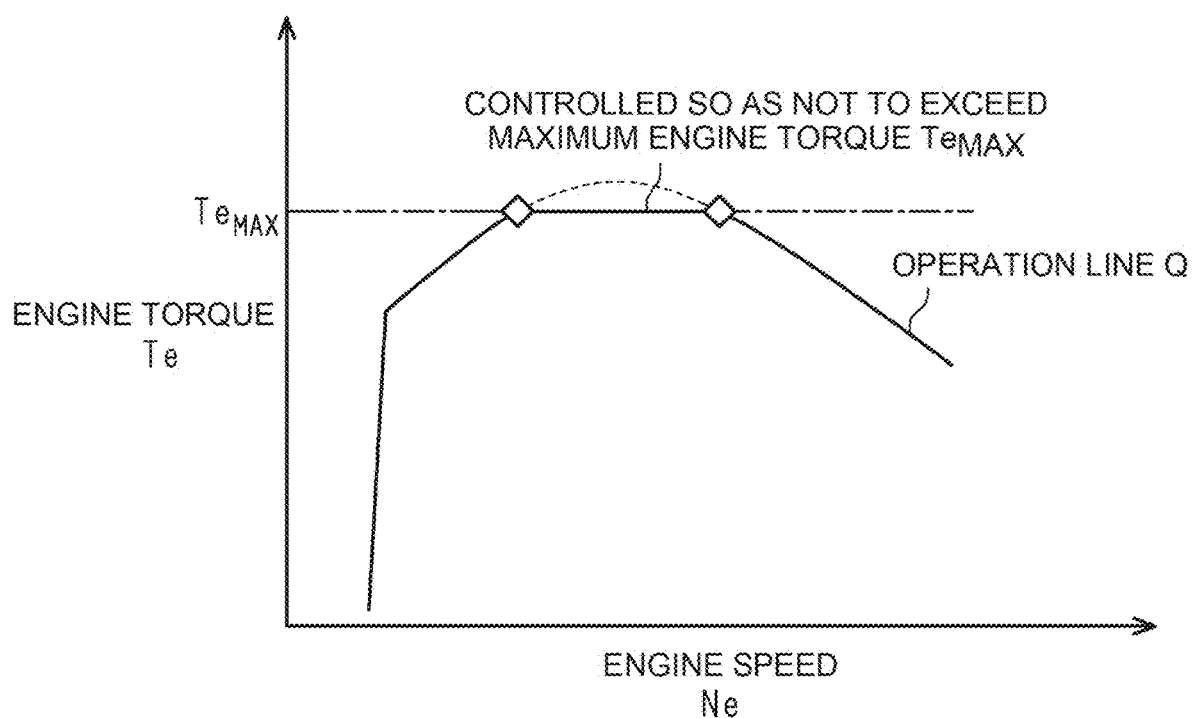
FIG. 5 is a graph showing a relationship between an operation line and restriction on the engine torque in the control device of the embodiment.

As shown in FIG. 5, a torque of the engine 11 at which the torque of the first motor-generator MG1 reaches the rated torque is referred to as a maximum engine torque Te_MAX. When the torque of the engine 11 exceeds the maximum engine torque Te_MAX, the control device 10 controls the engine 11 within such a range that the maximum engine torque Te_MAX is not exceeded. This is because, as described above, when the engine torque Te exceeds the maximum engine torque Te_MAX, the first motor-generator MG1 cannot completely restrain the sun gear 14 from rotating, so that the torque generated in the engine 11 fails to be sufficiently transmitted to the drive wheels 24.

As shown in FIG. 4 again, when the engine torque Te distributed to the first motor-generator MG1 exceeds the rated torque of the first motor-generator MG1 (step S160: NO), in the process of step S170, the control device 10 restricts the engine torque Te so as not to exceed the maximum engine torque Te_MAX. Then, in the process of step S180, the control device 10 controls the engine 11 by determining the operating point using the selected operation line Q while restricting the engine torque Te. Specifically, as shown in FIG. 5, the control device 10 controls the engine 11 using the operation line Q while restricting the engine torque Te so as not to exceed the maximum engine torque Te_MAX.

When the engine torque Te distributed to the first motor-generator MG1 is lower than the rated torque of the first motor-generator MG1 (step S160: YES), the engine torque Te is not restricted. Thus, the control device 10 controls the engine 11 by determining the operating point using the selected operation line Q (step S180).

When the control device 10 has determined in the process of step S120 that the alcohol concentration in the blended fuel is lower than the set concentration (step S120: NO), the control device 10 selects the operation line Q_E0. Then, the control device 10 controls the engine 11 by determining the operating point using the selected operation line Q (step S180).

Also when the control device 10 has determined in the process of step S130 that the engine coolant temperature is lower than the set temperature (step S130: NO), the control device 10 selects the operation line Q_E0. Then, the control device 10 controls the engine 11 by determining the operating point using the selected operation line Q (step S180).

When the control device 10 has executed the process of step S180, the control device 10 temporarily ends this series of processes.

Workings of Embodiment

In the above-described series of processes, the control device 10 does not perform the change of the operating point toward the high torque side (step S140) when the temperature of the engine 11 is low (step S130: NO). Thus, this control device 10 does not perform the change of the operating point toward the high torque side when changing the operating point toward the high torque side does not allow efficient operation.

Advantages of Embodiment (1) The control device 10 allows efficient operation of the engine 11 by restricting a needless increase in the fuel injection amount.

(2) In the plane of coordinates having each of the engine torque Te and the engine speed Ne as an axis, the plurality of operation lines Q connecting the plurality of operating points set according to the required output for the engine 11 is set so as to correspond to the alcohol concentrations in the blended fuel. The plurality of operation lines Q is each located in the plane of coordinates such that the higher the corresponding alcohol concentration in the blended fuel is, the farther on the high torque side the operation line Q is. The control device 10 performs the change of the operating point set according to the required output by selecting, according to the alcohol concentration in the blended fuel, the operation line Q to be used for calculating the operating point according to the required output from among the plurality of operation lines Q. The control device 10 can achieve the change of the operating point by selecting the operation line Q according to the alcohol concentration.

(3) The hybrid electric vehicle to which the control device 10 is applied includes the power distribution mechanism 13 having the ring gear 17 that operates in conjunction with the drive wheels 24, the sun gear 14, the pinion gear 15, and the planetary carrier 16. The hybrid electric vehicle includes the engine 11 of which the output shaft is coupled to the planetary carrier 16, the first motor-generator MG1 that operates in conjunction with the sun gear 14, the second motor-generator MG2 that operates in conjunction with the ring gear 17, and the battery 27. The control device 10 restricts the engine torque Te such that the torque that is distributed from the engine 11 to the first motor-generator MG1 through the power distribution mechanism 13 does not exceed the rated torque of the first motor-generator MG1. The control device 10 can prevent the first motor-generator MG1 from being subjected to excessive load as well as efficiently transmit the engine torque Te to the drive wheels 24.

(4) The control device 10 changes the operating point set according to the required output toward the higher torque side and the lower speed side when the alcohol concentration in the blended fuel is high than when the alcohol concentration in the blended fuel is low. The control device 10 executes this change on the conditions that the alcohol concentration in the blended fuel is equal to or higher than the set concentration specified beforehand and that warm-up of the engine 11 has been completed. The alcohol concentration in the blended fuel that is grasped by the control device 10 has a certain degree of error. Therefore, the change of the operating point according to the alcohol concentration in the blended fuel may fail to exert its effects unless executed when the alcohol concentration in the blended fuel is at a certain high level. In the control device 10, that the alcohol concentration in the blended fuel is equal to or higher than the set concentration is also included in the conditions for executing the change of the operating point. Thus, the change of the operating point can be executed in a state where the conditions are in place under which the effects are expected to be exerted.

(5) The control device 10 acquires the engine coolant temperature detected by the coolant temperature sensor 34, and when the acquired engine coolant temperature is equal to or higher than the set temperature specified beforehand, determines that warm-up of the engine 11 has been completed. The control device 10 can determine that warm-up of the engine 11 has been completed based on the engine coolant temperature acquired using the coolant temperature sensor 34.

Modified Examples

The embodiment can be implemented with the following changes made thereto. The embodiment and the following modified examples can be implemented in combination within such a range that no technical inconsistency arises.

Figure 6:
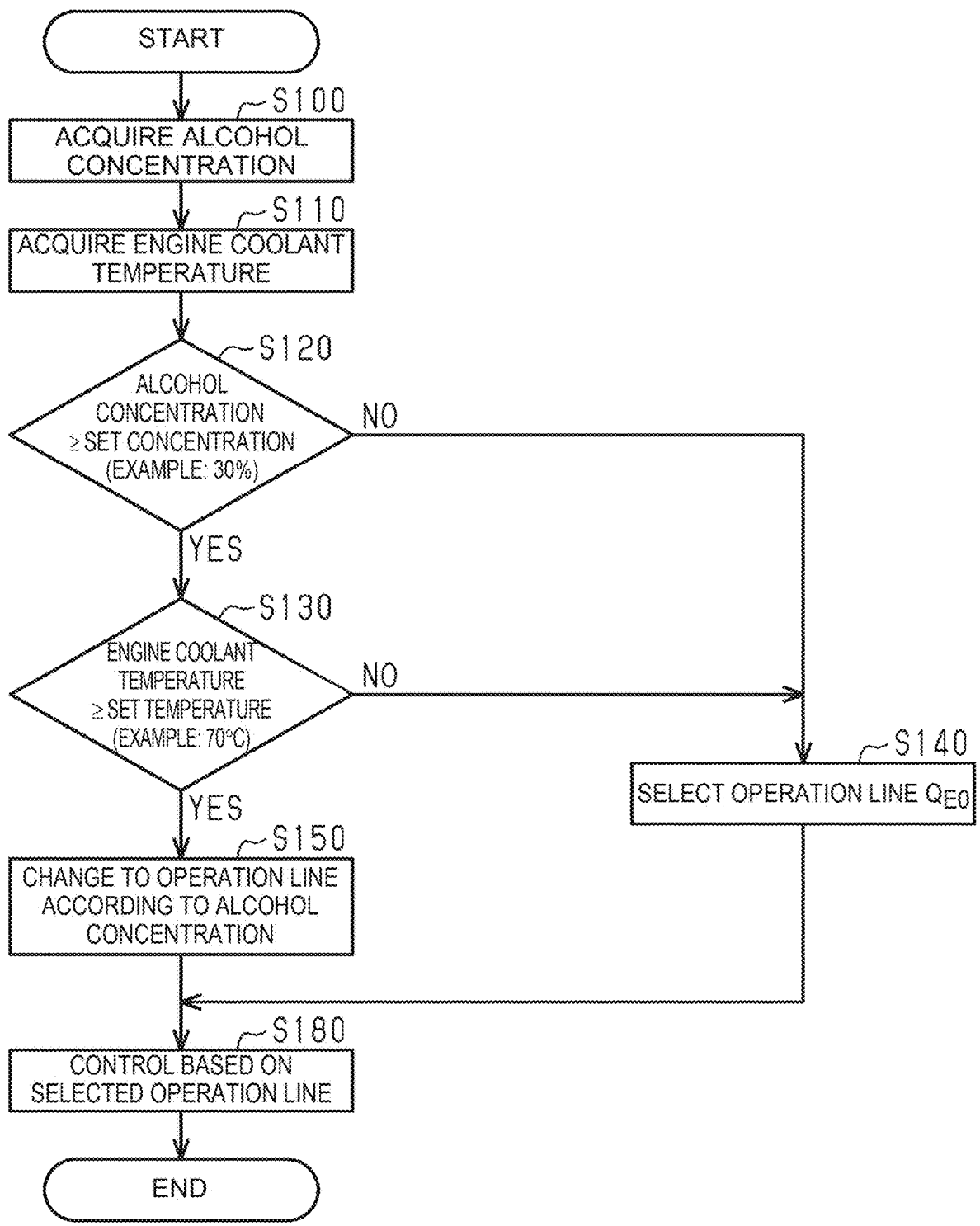
FIG. 6 is a flowchart of engine control in a control device of a modified example.

The control device 10 need not restrict the engine torque Te if the torque of the first motor-generator MG1 does not exceed the rated torque when the engine 11 is operated at the maximum engine torque Te_MAX. In this case, as shown in FIG. 6, the control device 10 may control the engine 11 by executing a series of processes from which step S160 and step S170 are omitted.

The control device 10 need not double as the control device of the hybrid system. In this case, a control device of the hybrid system is installed in the vehicle separately from the control device 10.

The control device 10 may be applied to a vehicle that is equipped with only the engine 11 as a drive power source. In this case, as shown in FIG. 6, the control device 10 may control the engine 11 by executing the series of processes from which step S160 and step S170 are omitted.

The control device 10 may control the engine 11 by, instead of selecting the operation line Q, changing the operating point to an operating point that meets appropriate engine torque Te and engine speed Ne according to the alcohol concentration in the blended fuel and the required output.

In the embodiment, the control device 10 continuously changes the operation line Q toward the high torque side as the alcohol concentration in the blended fuel becomes higher. On the other hand, the control device 10 may control the engine 11 so as to change the operating point to an operating point on the high torque, low speed side when the alcohol concentration in the blended fuel exceeds a threshold value. For example, the control device 10 changes the operation line Q to the operation line Q_E0 when the alcohol concentration in the blended fuel is 0% or higher and lower than 50%, to the operation line Q_E50 when the alcohol concentration is 50% or higher and lower than 100%, and to the operation line Q_E100 when the alcohol concentration is 100%. The control device 10 controls the engine 11 so as to achieve the engine torque Te and the engine speed Ne that define the operating point set according to the required output on the selected operation line Q. Thus, the control device 10 changes the operating point toward the higher torque side and the lower speed side when the alcohol concentration in the blended fuel is high than when the alcohol concentration in the blended fuel is low.

The control device 10 may omit the process of step S120. In this case, when alcohol is contained in the blended fuel, the control device 10 changes the operating point toward the higher torque side and the lower speed side when the alcohol concentration in the blended fuel is high than when the alcohol concentration in the blended fuel is low.

In the embodiment, the control device 10 determines whether the alcohol concentration in the blended fuel is higher than the set concentration based on the alcohol concentration acquired by the alcohol concentration sensor 36 installed in the fuel tank 12. The control device 10 may instead estimate an alcohol concentration value of the blended fuel from a learned value of an air-fuel ratio of exhaust. Compared with a gasoline fuel, an alcohol fuel has a low stoichiometric air-fuel ratio. Therefore, when the alcohol concentration in a blended fuel becomes higher, the stoichiometric air-fuel ratio of the blended fuel becomes lower. Thus, when the injection amount of the fuel is equal, the air-fuel ratio of the exhaust becomes lower as the alcohol concentration in the blended fuel becomes higher. Here, the air-fuel ratio of the exhaust when the alcohol concentration is 0% will be referred to as a reference air-fuel ratio. The control device 10 can estimate the alcohol concentration in the blended fuel from a difference between the air-fuel ratio of the exhaust acquired by an air-fuel ratio sensor and the reference air-fuel ratio, and the stoichiometric air-fuel ratio at each alcohol concentration in the blended fuel that is stored in advance.

Instead of determining the alcohol concentration in the blended fuel based on the alcohol concentration acquired by the alcohol concentration sensor 36 installed in the fuel tank 12, the control device 10 may estimate the alcohol concentration value of the blended fuel from a feedback value of the fuel injection amount. As described above, as the alcohol concentration in the blended fuel becomes higher, the stoichiometric air-fuel ratio of the blended fuel becomes lower. Thus, the control device 10 needs to perform feedback control on the fuel injection amount based on the air-fuel ratio acquired by the air-fuel ratio sensor. The control device 10 can estimate the alcohol concentration in the blended fuel from the fuel injection amount obtained as a result of the feedback control and the fuel injection amount at each alcohol concentration in the blended fuel that is stored in advance.

The control device 10 may determine whether warm-up has been completed based on an engine oil temperature acquired by an engine oil temperature sensor.

When determining whether warm-up of the engine 11 has been completed, the control device 10 may perform the determination by inferring a warm-up state of the engine 11 from a past operation history of the engine 11. For example, the control device 10 may determine that warm-up has been completed when the engine 11 has started and operation at an engine speed Ne equal to or higher than a certain speed has continued for a certain time or longer.

When determining whether warm-up of the engine 11 has been completed, the control device 10 may determine that warm-up has been completed when an accumulated intake air amount from the start of operation has become equal to or larger than a predetermined value. The control device 10 may acquire information on the accumulated intake air amount from the air flow meter 31.

What is claimed is:

1. An engine control device that is applied to a vehicle equipped with an engine capable of using a blended fuel in which an alcohol fuel and a gasoline fuel are blended, the engine control device configured to control the engine so as to achieve an engine torque and an engine speed that define an operating point set according to a required output, the engine control device comprising:
 a processor; and
 a memory storing program instructions that cause the processor to:
  acquire an alcohol concentration in the blended fuel by an alcohol concentration sensor;
  acquire an engine coolant temperature detected by a coolant temperature sensor; and
  determine whether the acquired engine coolant temperature is equal to or higher than a threshold, wherein
 in response to the determination that the acquired engine coolant temperature is equal to or higher than the threshold, the engine control device changes the operating point based on the acquired alcohol concentration, such that the operating point is changed to a higher torque side and a lower speed side as the acquired alcohol concentration increases; and in absence of the determination that the acquired engine coolant temperature is equal to or higher than the threshold, the engine control device does not change the operating point based on the acquired alcohol concentration.

2. The engine control device according to claim 1, wherein:

the memory stores a plurality of operation profiles corresponding to various alcohol concentrations;

each of the operation profiles including a line connecting a plurality of the operating points in a plane of coordinates having each of the engine torque and the engine speed as an axis;

the line in each of the operation profiles is higher on the torque side as the alcohol concentration increases; and the engine control device is configured to select the operation profile that corresponds to the acquired alcohol concentration from the plurality of operation profiles, calculating the operating point according to the required output based on the selected operation profile, change the operating point to the calculated operating point.

3. The engine control device according to claim 1 that is applied to a hybrid electric vehicle including:

a power distribution mechanism having a ring gear that operates in conjunction with a drive wheel, a sun gear that rotates on its axis at a center of the ring gear, a pinion gear that is interposed between the sun gear and the ring gear and revolves around the sun gear, and a planetary carrier that rotates as the pinion gear revolves;

the engine of which an output shaft is coupled to the planetary carrier;

a first motor-generator that operates in conjunction with the sun gear;

a second motor-generator that operates in conjunction with the ring gear; and a battery that exchanges electricity with the first motor-generator and the second motor-generator, wherein when changing the operating point, the engine control device is configured to restrict the engine torque such that a torque that is distributed from the engine to the first motor-generator through the power distribution mechanism does not exceed a rated torque of the first motor-generator.

4. The engine control device according to claim 1, wherein the engine control device is configured to determine whether the acquired alcohol concentration is equal to or higher than a threshold concentration, and the engine control device is configured to change the operating point based on the acquired alcohol concentration, in response to the determination that the acquired alcohol concentration is equal to or higher than the threshold concentration and the determination that the acquired engine coolant temperature is equal to or higher than the threshold.

\* \* \* \* \*